United States Patent
Shimauchi et al.

(10) Patent No.: US 9,851,222 B2
(45) Date of Patent: Dec. 26, 2017

(54) MAGNETIC DETECTION DEVICE

(71) Applicant: Mitsubishi Electric Corporation, Tokyo (JP)

(72) Inventors: Hideki Shimauchi, Tokyo (JP); Masahiro Yokotani, Tokyo (JP); Akira Koshimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/092,734

(22) Filed: Apr. 7, 2016

(65) Prior Publication Data
US 2017/0108355 A1  Apr. 20, 2017

(30) Foreign Application Priority Data
Oct. 14, 2015  (JP) .................................. 2015-202842

(51) Int. Cl.
*G01D 5/16*    (2006.01)

(52) U.S. Cl.
CPC ..................................... *G01D 5/16* (2013.01)

(58) Field of Classification Search
CPC .......... G07D 7/04; G07D 7/168; G01D 5/145; G01D 5/16; G01R 33/098; G01R 33/06; G01R 33/072
USPC ...... 324/200, 207.12–207.21, 174, 173, 166, 324/205–263, 500, 529, 750.12, 750.21, 324/754.17, 754.29, 167, 179
See application file for complete search history.

(56) References Cited

U.S. PATENT DOCUMENTS

| | | | | |
|---|---|---|---|---|
| 5,574,364 A | * | 11/1996 | Kajimoto | ............. F02D 41/009 324/207.12 |
| 2009/0001965 A1 | * | 1/2009 | Ausserlechner | ....... G01D 5/145 324/202 |

FOREIGN PATENT DOCUMENTS

| | | |
|---|---|---|
| DE | 198 50 460 A1 | 10/1999 |
| DE | 100 10 042 A1 | 7/2001 |
| DE | 101 38 908 A1 | 8/2002 |
| DE | 103 25 317 A1 | 2/2004 |
| JP | 3655897 A | 6/2005 |

OTHER PUBLICATIONS

Communication dated Nov. 14, 2016, from the German Patent Office in counterpart German application No. 10 2016 210 403.9.

* cited by examiner

*Primary Examiner* — Melissa Koval
*Assistant Examiner* — Trung Nguyen
(74) *Attorney, Agent, or Firm* — Sughrue Mion, PLLC; Richard C. Turner

(57) ABSTRACT

A magnetic detection device has: a magnetic moving body which rotates about a rotating shaft and in which N-poles and S-poles are disposed alternately on an outer periphery thereof; magnetoresistive elements that are disposed at a spacing from the outer peripheral surface of the magnetic moving body; a signal processing unit that processes signals from the magnetoresistive elements; and a magnet that applies a bias magnetic field to the magnetoresistive elements. The magnetization direction of the magnet is parallel to the rotating shaft of the magnetic moving body. The magnetoresistive elements are disposed in a plane perpendicular to the magnetization direction of the magnet, and are disposed at a fixed spacing in the radial direction of the magnetic moving body.

9 Claims, 9 Drawing Sheets

MAGNETIC DETECTION DEVICE

BACKGROUND OF THE INVENTION

Field of the Invention

The present invention relates to a magnetic detection device, and more particularly to a magnetic detection device for detecting a magnetic field that changes with the passage of time, for instance as in the magnetic field of a rotating body on which magnets are provided.

Description of the Related Art

For instance, Japanese Patent No. 3655897 discloses a conventional magnetic detection device for detecting a magnetic field that changes with time.

In such a conventional magnetic detection device, a disc-like magnetic moving body rotates in the circumferential direction with a rotating shaft as an axis. In a case where, for instance, a rotating shaft is attached to the crankshaft of an engine or a wheel axle, a magnetic moving body rotates integrally with the crankshaft or the wheel axle. The outer peripheral surface of the magnetic moving body is magnetized in such a manner that N-poles and S-poles are disposed alternately. A detection element is disposed facing the magnetic moving body. The detection element detects changes in the magnetism of the magnetic moving body when the latter rotates. A magnetoresistive element is used as the detection element. When the magnetic moving body rotates, the magnetic moving body passes in front of the detection element, and hence changes in the magnetic field can be detected through detection, by the detection element, of the number of passes of the magnetic moving body.

FIG. 10 is a perspective-view diagram illustrating the configuration of a conventional magnetic detection device. The magnetic detection device is provided with a magnetic moving body and magnetoresistive elements. FIG. 11A and FIG. 11B are enlarged-view diagrams of a detection element portion of the magnetic detection device of the FIG. 10. FIG. 11A is a side-view diagram and FIG. 11B is a top-view diagram.

In FIG. 10, FIG. 11A and FIG. 11B, the reference sign 101 denotes a magnetic moving body. The outer peripheral surface of the magnetic moving body is magnetized in such a manner that N-poles and S-poles are disposed alternately. The reference signs 102a and 102b denote magnetoresistive elements. The reference sign 103 is a magnet that applies a bias magnetic field to the magnetoresistive elements 102a, 102b. The reference sign 102 is a processing circuit unit. The processing circuit unit 102 has a board on the surface of which a circuit is printed. The reference sign 104 is a rotating shaft of the magnetic moving body 101. The rotating shaft 104 and the magnetic moving body 101 rotate in synchrony. The magnet 103 is magnetized in a direction parallel to the rotating shaft 104 of the magnetic moving body 101, as denoted by the solid-line arrow in FIG. 11A. The magnet 103 is disposed at a given distance from the outer peripheral surface of the magnetic moving body 101. The magnetoresistive elements 102a, 102b are disposed above the magnet 103. The magnetoresistive elements 102a, 102b are disposed side by side along the circumferential direction of the magnetic moving body 101, as illustrated in FIG. 11B. The magnetoresistive elements 102a, 102b are disposed at a given spacing Le therebetween. The dashed-line arrows in FIG. 11A denote a bias magnetic field generated by the magnet 103. A combined magnetic field of the bias magnetic field generated by the magnet 103 and the magnetic field generated by the magnetic moving body 101 is present around the magnetoresistive elements 102a, 102b. The magnetoresistive elements 102a, 102b detect only a magnetic field in a plane perpendicular to the rotating shaft 104, within the combined magnetic field.

FIG. 12 is a diagram illustrating a characteristic of the magnetoresistive elements that are used in the conventional magnetic detection device. In FIG. 12, the horizontal axis is the magnetic field (A/m) that is applied to the magnetoresistive elements 102a, 102b. The vertical axis is a resistance change rate (%) of the magnetoresistive elements 102a, 102b. As illustrated in FIG. 12, the resistance value is maximum when the magnetic field applied to the magnetoresistive elements 102a, 102b is zero. On the other hand, the resistance value decreases as the value of the applied magnetic field increases.

In the conventional magnetic detection device, as described above, a bias magnetic field is applied by the magnet 103 to the magnetoresistive elements 102a, 102b. This bias magnetic field is depicted in FIG. 12 as a bias magnetic field B0. When the magnetic moving body 101 rotates with the rotating shaft 104 as an axis, the variation of the magnetic field that is applied to the magnetoresistive elements 102a, 102b by the magnetic field of the magnetic moving body 101, i.e. the operating magnetic field range, is a range extending from B1 to B2 in FIG. 12. In this case, the operating magnetic field range of the magnetoresistive elements 102a and 102b is the same as each other, since the magnetoresistive elements 102a, 102b are disposed, at the fixed spacing Le, along the rotation direction of the magnetic moving body 101.

In the conventional magnetic detection device, the processing circuit unit 102 outputs a signal corresponding to the multipolar magnetization of the magnetic moving body 101, on the basis of the changes in the resistance values of the magnetoresistive elements 102a, 102b. The processing circuit unit 102 determines a difference between the resistance values of the magnetoresistive elements 102a, 102b, and obtains an output signal Vc by performing voltage conversion of that difference. The processing circuit unit 102 further subjects the output signal Vc to waveform shaping, to obtain thereby a final output signal Vo.

FIG. 13 is an example of a timing chart illustrating the operation of the conventional magnetic detection device. In FIG. 13, (a) denotes the resistance values of the magnetoresistive elements 102a, 102b, (b) denotes the output signal Vc, and (c) denotes the output signal Vo. Further, P is the magnetic pole pitch between the N-poles and the S-poles of the magnetic moving body 101.

The magnetic field that is applied to the magnetoresistive elements 102a, 102b varies according to the rotation of the magnetic moving body 101 with the rotating shaft 104 as an axis. The resistance values of the magnetoresistive elements 102a, 102b vary as a result, as illustrated in FIG. 13(a). In FIG. 13(a), the dashed line denotes the resistance value of the magnetoresistive element 102a and the solid line denotes the resistance value of the magnetoresistive element 102b. The magnetoresistive elements 102a and 102b are disposed, at the spacing Le therebetween, along the rotation direction of the magnetic moving body 101. Accordingly, the resistance changes of the magnetoresistive elements 102a, 102b are offset from each other by a phase proportional to the spacing Le, as illustrated in FIG. 13(a). Therefore, the output signal Vc illustrated in FIG. 13(b) is obtained by determining a difference of the resistance values of the magnetoresistive elements 102a, 102b and performing conversion to voltage of the difference. The output signal Vo corresponding to the magnetic poles of the magnetic moving body 101 can be obtained, through waveform shaping, by comparing the output signal Vc with a threshold voltage Vref, as illustrated in FIG. 13(c). Herein the output signal Vc is substantially sinusoidal in a case where the magnetic pole pitch P of the magnetic moving body 101 is substantially identical to the spacing Le between the magnetoresistive elements 102a, 102b.

SUMMARY OF INVENTION

Technical Problem

The output signal Vc varies abruptly in the vicinity of the magnetic pole center of the magnetic moving body 101 in a case where the magnetic pole pitch P of the magnetic moving body 101 and the spacing Le between the magnetoresistive elements 102a, 102b are substantially identical, as described above. Accordingly, the rotational position of the magnetic moving body 101 can be detected with high precision, in the conventional magnetic detection device as well, in a case where the magnetic pole pitch P and the spacing Le are substantially identical. However, the magnetization pattern of the magnetic moving body 101 may adopt various patterns, depending on the application of the magnetic moving body 101, while the magnetic pole pitch P varies also depending on each application.

FIG. 14 is another example of a timing chart illustrating the operation of the conventional magnetic detection device. The example illustrated in FIG. 14 is an instance where the magnetic pole pitch P of the magnetic moving body 101 is larger than the spacing Le of the magnetoresistive elements 102a, 102b.

In FIG. 14, (a) denotes the resistance values of the magnetoresistive elements 102a, 102b, (b) denotes the output signal Vc, and (c) denotes the output signal Vo. In FIG. 14(a), the dashed line denotes the resistance value of the magnetoresistive element 102a and the solid line denotes the resistance value of the magnetoresistive element 102b.

As illustrated in FIG. 14, the same magnetic field is applied to the magnetoresistive elements 102a and 102b in a case where the magnetic pole pitch P of the magnetic moving body 101 is larger than the spacing Le between the magnetoresistive elements 102a, 102b. As a result, a region (A) arises in which the output signal Vc is a fixed voltage, as illustrated in FIG. 14(c). The output signal Vc and the threshold voltage Vref come close to each other in such a region (A); as a result, the output signal Vc is readily influenced by disturbance noise and the like, and false pulses as well are likely to occur in the output signal Vo. Further, the voltage change of the output signal Vc is gentle, and hence the positions of the falling signal and the rising signal of the output signal Vo fluctuate readily, and detection precision is poor.

In order to avoid the above state, it is effective to set the spacing Le between the magnetoresistive elements 102a, 102b in accordance with the magnetic pole pitch P of the magnetic moving body 101. However, a larger magnetic pole pitch P of the magnetic moving body 101 entails a larger spacing Le between the magnetoresistive elements 102a, 102b. As a result, the board that makes up the processing circuit unit 102 increases in size, and then, the magnetic detection device increases in size and cost. Also, the spacing Le between the magnetoresistive elements 102a, 102b must be adjusted for each magnetic moving body 101.

It is an object of the present invention, which was arrived at with a view to solving the above problems, to obtain a magnetic detection device capable of detecting the rotation of a magnetic moving body with high precision, with no dependence on the magnetic pole pitch of the N-poles and S-poles of the magnetic moving body.

Solution to Problem

The present invention is a magnetic detection device that includes: a magnetic moving body in which N-poles and S-poles are disposed alternately on a circular outer periphery thereof and which rotates about a rotating shaft thereof; two magnetoresistive elements that are disposed facing the outer periphery of the magnetic moving body and that detect changes in a magnetic field of the magnetic moving body; a signal processing unit that processes signals of the magnetoresistive elements; and a magnet that applies a bias magnetic field to the magnetoresistive elements, wherein a magnetization direction of the magnet is parallel to the rotating shaft of the magnetic moving body, and the magnetoresistive elements are disposed in a plane perpendicular to the magnetization direction of the magnet, and the magnetoresistive elements are disposed side by side spaced apart from each other, in a radial direction of the magnetic moving body.

Advantageous Effects of Invention

In the present invention, the magnetoresistive elements are disposed in the radial direction of the magnetic moving body, and hence an effect is elicited of enabling high-precision detection of the rotation of the magnetic moving body, with no dependence on the magnetic pole pitch of the N-poles and S-poles of the magnetic moving body.

DETAILED DESCRIPTION OF THE PREFERRED EMBODIMENTS

Embodiment 1

Figure 1:
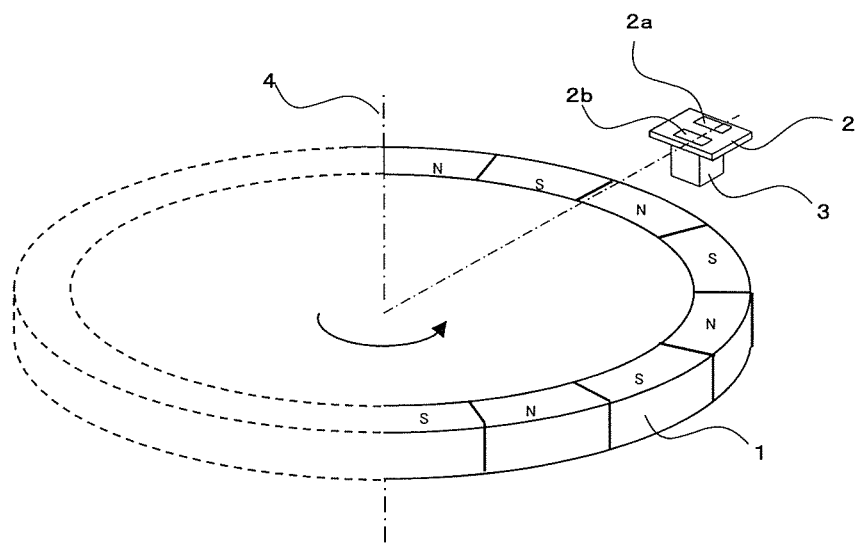
FIG. 1 is a perspective-view diagram illustrating the configuration of a magnetic detection device according to Embodiment 1 of the present invention.
Figure 2A:
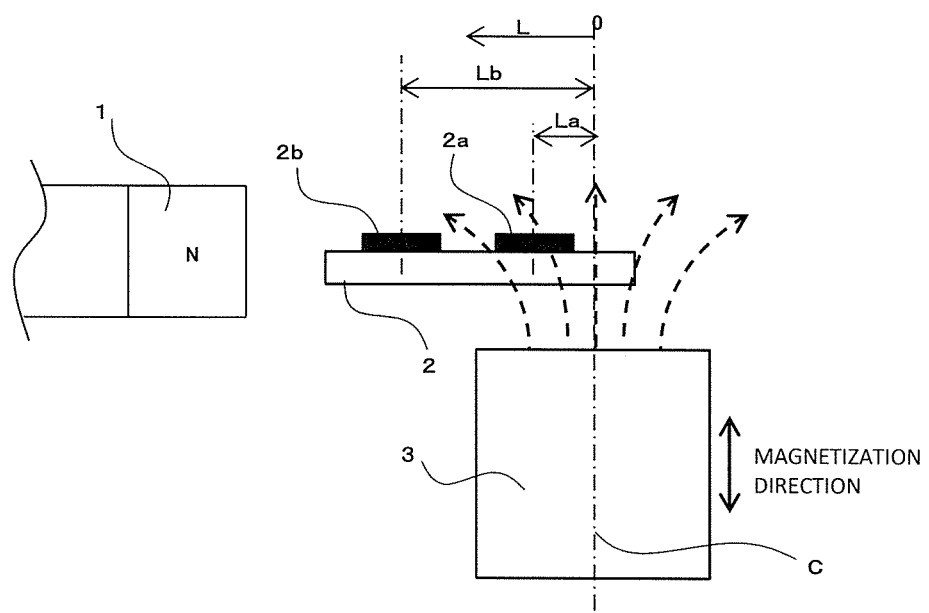
FIG. 2A is an enlarged side-view diagram of a detection unit in the magnetic detection device according to Embodiment 1 of the present invention.
Figure 2B:
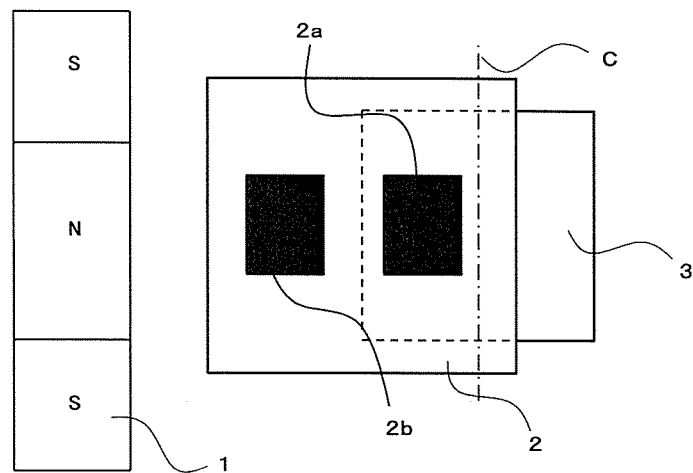
FIG. 2B is an enlarged top-view diagram of the detection unit in the magnetic detection device according to Embodiment 1 of the present invention.

FIG. 1 is a perspective-view diagram illustrating the configuration of a magnetic detection device according to Embodiment 1 of the present invention. FIG. 2A and FIG. 2B are enlarged-view diagrams of a detection unit of a magnetic detection device. FIG. 2A is a side-view diagram of a detection unit, and FIG. 2B is a top-view diagram of the detection unit.

As illustrated in FIG. 1, the magnetic detection device according to the present Embodiment 1 is made up of a magnetic moving body 1, magnetoresistive elements 2a, 2b, a board 2, a magnet 3 and a rotating shaft 4.

The magnetic moving body 1 has a disc shape or a circular tubular shape. The circular outer periphery of the magnetic moving body 1 is magnetized to a ring shape, such that N-poles and S-poles are disposed alternately. A rotating shaft 4 runs through the center of the magnetic moving body 1. The magnetic moving body 1 rotates in a circumferential direction with the rotating shaft 4 as an axis.

The magnetoresistive elements 2a, 2b are mounted on the board 2. Between the board 2 and the outer periphery of the magnetic moving body 1 there is a gap of a distance set beforehand. The board 2 may be made up of a circuit board on which the magnetoresistive elements 2a, 2b are mounted, or may be made up of an IC that comprises the magnetoresistive elements 2a, 2b and a processing circuit. The magnetoresistive elements 2a, 2b may be provided on the lower face of the board 2 instead of on the top face of the board 2.

As illustrated in FIG. 1, the magnetoresistive elements 2a, 2b are disposed side by side in the radial direction of the magnetic moving body 1. The magnetoresistive elements 2a, 2b are disposed spaced apart from each other by a fixed distance set beforehand. The magnetoresistive element 2b is positioned closer to the magnetic moving body 1 than the magnetoresistive element 2a. Accordingly, the distance from the magnetoresistive element 2b to the magnetic moving body 1 is shorter than the distance from the magnetoresistive element 2a to the magnetic moving body 1.

In FIG. 2A, the magnet 3 is disposed below the board 2. That is, the board 2 and the magnet 3 are disposed in this order in a direction parallel to the rotating shaft 4. The board 2 does not stand directly above the magnet 3; herein, one end of the board 2 protrudes further towards the magnetic moving body 1 than one end of the magnet 3. Between the magnet 3 and the board 2 there is a gap of a distance set beforehand, in a direction parallel to the rotating shaft 4. The magnet 3 applies a bias magnetic field to the magnetoresistive elements 2a, 2b.

The magnet 3 is magnetized in a direction parallel to the rotating shaft 4, as denoted by the solid-line arrow in FIG. 2A. The board 2 is disposed in a plane substantially perpendicular to the magnetization direction of the magnet 3. As illustrated in FIG. 2A and FIG. 2B, a central axis C designates herein the central axis of the magnet 3 in the magnetization direction. The central axis C is parallel to the rotating shaft 4.

The magnetoresistive element 2a is disposed on the board 2 at a position shifted from the central axis C towards the magnetic moving body 1, by a distance La. The magnetoresistive element 2b is disposed on the board 2 at a position shifted from the central axis C towards the magnetic moving body 1 by a distance Lb. Assuming that the horizontal direction is the direction perpendicular to the central axis C of the magnet 3, the distance La is the distance between the center line of the magnetoresistive element 2a in the horizontal direction and the central axis C of the magnet 3. Similarly, the distance Lb is the distance between the center line of the magnetoresistive element 2b in the horizontal direction and the central axis C of the magnet 3. The distances La, Lb need be different and may be set to any arbitrary distance.

The dashed-line arrows in FIG. 2A denote the bias magnetic field generated by the magnet 3. A combined magnetic field made up of the bias magnetic field generated by the magnet 3 and the magnetic field generated by the magnetic moving body 1 is present around the magnetoresistive elements 2a, 2b. The magnetoresistive elements 2a, 2b detect only a magnetic field in a plane perpendicular to the rotating shaft 4, within the combined magnetic field.

Figure 3:
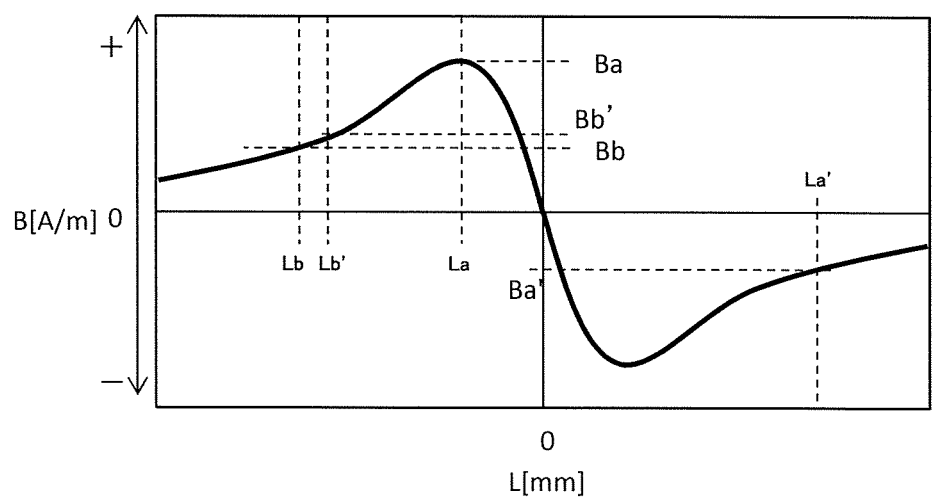
FIG. 3 is a diagram illustrating the relationship between a distance L from a central axis of a magnet that applies a bias magnetic field to magnetoresistive elements and a magnetic field B, in the magnetic detection device according to Embodiment 1 of the present invention.

FIG. 3 illustrates the relationship between a magnetic field B by the magnet 3, and a distance L from the central axis C of the magnet 3. In FIG. 3 the horizontal axis is the distance L (mm) from the central axis C of the magnet 3. The vertical axis is the magnetic field B (A/m) and the signs +/− denote the orientation of the magnetic field B. The magnetic field B illustrates a component perpendicular to the magnetization direction of the magnet 3, within the bias magnetic field from the magnet 3. The reference signs La and Lb in FIG. 3 are the reference signs La in Lb illustrated in FIG. 2A. The magnetic field Ba designates a component perpendicular to the magnetization direction of the magnet 3, within the bias magnetic field from the magnet 3 towards the magnetoresistive element 2a. Similarly, the magnetic field Bb designates a component perpendicular to the magnetization direction of the magnet 3, within the bias magnetic field from the magnet 3 towards the magnetoresistive element 2b. The reference signs La', Lb', Ba' and Bb' in FIG. 3 will be explained in Embodiment 2 described below.

Figure 4:
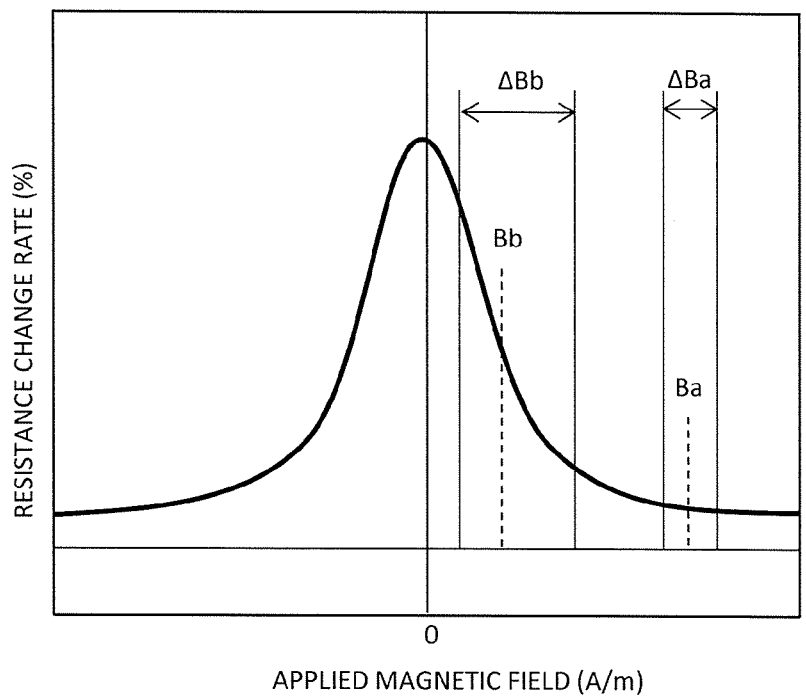
FIG. 4 is a diagram illustrating a MR loop characteristic of magnetoresistive elements in the magnetic detection device according to Embodiment 1 of the present invention.

FIG. 4 is a diagram illustrating a characteristic, specifically an MR curve, of the magnetoresistive elements 2a, 2b. In FIG. 4, the horizontal axis is magnetic field (A/m) that is applied to the magnetoresistive elements 2a, 2b. The vertical axis is a resistance change rate (%). The reference signs Ba and Bb in FIG. 4 correspond to the reference signs Ba and Bb in FIG. 3. The reference signs ΔBa and ΔBb will be explained further on.

In the present embodiment, mutually different bias magnetic fields Ba, Bb are respectively applied to the magnetoresistive elements 2a, 2b by the magnet 3, as illustrated in FIG. 3 and FIG. 4. The bias magnetic field Ba is stronger than the bias magnetic field Bb, and there holds the relationship Ba>Bb.

When the magnetic moving body 1 rotates about the rotating shaft 4, the magnetic field that is applied to the magnetoresistive element 2a by the magnetic field from the magnetic moving body 1 lies within the range of ΔBa. Accordingly, ΔBa constitutes the operating magnetic field range of the magnetoresistive element 2a. Similarly, when the magnetic moving body 1 rotates about the rotating shaft 4, the magnetic field that is applied to the magnetoresistive element 2b by the magnetic field from the magnetic moving body 1 lies within the range of ΔBb. Accordingly, ΔBb constitutes the operating magnetic field range of the magnetoresistive element 2b. As illustrated in FIG. 4, the operating magnetic field range ΔBa of the magnetoresistive element 2a and the operating magnetic field range ΔBb of the magnetoresistive element 2b are different in that ΔBb is wider than ΔBa, and there holds a relationship ΔBb>ΔBa.

The strong bias magnetic field Ba is applied to the magnetoresistive element 2a, and is set to yield a saturated region on the MR curve. Accordingly, the resistance change in the magnetoresistive element 2a is small even upon changes in the magnetic field that is applied to the magnetoresistive element 2a through rotation of the magnetic moving body 1. On the other hand, the weak bias magnetic field Bb is applied to the magnetoresistive element 2b, and is disposed at a region of abrupt resistance change on the MR loop. Accordingly, the resistance change of the magnetoresistive element 2b is large in a case where the magnetic field applied to the magnetoresistive element 2b changes according to the rotation of the magnetic moving body 1.

As described above, the magnetoresistive element 2b stands at a closer distance to the magnetic moving body 1 than the magnetoresistive element 2a. Accordingly, the variation of the applied magnetic field when the magnetic moving body 1 rotates is large, and the resistance value change is large as well. The magnetoresistive elements 2a and 2b need to exhibit different variation in resistance value and, accordingly, the bias magnetic field Ba that is applied to the magnetoresistive element 2a need not be a saturated region on the MR curve.

The reason for using the magnetoresistive element 2a, despite the fact that the resistance value change is small, is to improve the temperature characteristic. If a fixed resistance were hypothetically used instead of the magnetoresistive element 2a the output signal Vc based on a difference between the resistance value of the magnetoresistive element 2a and the resistance value of the magnetoresistive element 2b would fluctuate significantly depending on changes in temperature, since temperature coefficients differ between the resistance value of the magnetoresistive element 2b and the resistance value of the fixed resistance. This will be explained in detail next.

Figure 5:
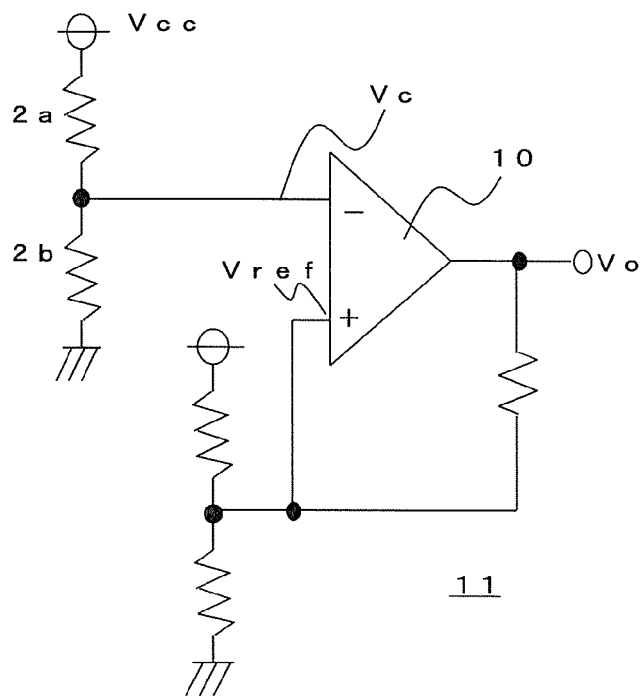
FIG. 5 is a circuit diagram illustrating an example of a signal processing unit of the magnetic detection device according to Embodiment 1 of the present invention.

Changes in the resistance values in the magnetoresistive elements 2a, 2b undergo signal processing in the detection unit illustrated in FIG. 5. FIG. 5 is a diagram illustrating the configuration of the detection unit of the magnetic detection device according to the present Embodiment 1. The detection unit is made up of the magnetoresistive elements 2a, 2b and a signal processing unit 11 on the board 2. A comparator 10 is provided in the signal processing unit 11.

As illustrated in FIG. 5, the magnetoresistive elements 2a, 2b are connected in series to constitute a bridge circuit. In FIG. 5, Vc is an output signal of the bridge circuit. Further, Vref is the threshold voltage inputted to the comparator 10, and Vo is the output signal of the comparator 10. The magnetoresistive elements 2a, 2b are connected is series between a constant voltage Vcc and ground. Accordingly, the change in the resistance values of the magnetoresistive elements 2a, 2b is converted to voltage to obtain the output signal Vc. The output signal Vc is inputted to the comparator 10. The inputted output signal Vc is subjected to waveform shaping by comparing the inputted output signal Vc with the threshold voltage Vref in the comparator 10, so as to obtain and output the output signal Vo.

In the detection unit illustrated in FIG. 5, the output signal Vc is thus determined on the basis of a difference between the resistance values of the magnetoresistive elements 2a, 2b. In cases of large temperature changes, therefore, the output signal Vc includes an error when the temperature coefficients of the magnetoresistive elements 2a, 2b are different. Therefore, it is preferable to use identical elements, having the same temperature coefficient, as the magnetoresistive elements 2a, 2b. The magnetoresistive element 2a is used for this reason, even though changes in the resistance value of the magnetoresistive element 2a are small.

Figure 6:
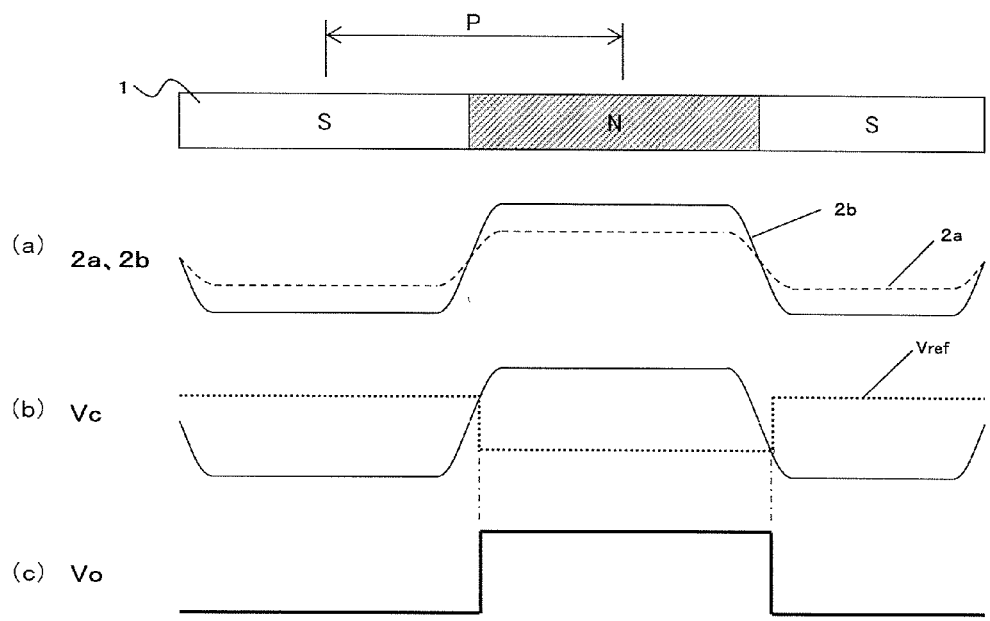
FIG. 6 is a timing chart illustrating the operation of the magnetic detection device according to Embodiment 1 of the present invention.

FIG. 6 is a timing chart illustrating the operation of the magnetic detection device according to the present Embodiment 1. In FIG. 6, (a) denotes the change in resistance values of the magnetoresistive elements 2a, 2b when the magnetic moving body 1 rotates with the rotating shaft 4 as an axis, (b) denotes the output signal Vc of the bridge circuit, and (c) denotes the output signal Vo of the comparator 10. In FIG. 6(*a*), the dashed line denotes the resistance value of the magnetoresistive element 2a and the solid line denotes the resistance value of the magnetoresistive element 2b.

The magnetic field that is applied to the magnetoresistive elements 2a, 2b varies according to the rotation of the magnetic moving body 1 with the rotating shaft 4 as an axis. The resistance values of the magnetoresistive elements 2a, 2b vary as a result, as illustrated in FIG. 6(*a*). At this time, the magnetoresistive elements 2a, 2b are disposed spaced apart from each other by a fixed distance set beforehand, in the radial direction of the magnetic moving body 1. Accordingly, there is no phase difference in the resistance change of the magnetoresistive elements 2a, 2b. On the other hand, as illustrated in FIG. 4, since the operating magnetic field ranges ΔBa and ΔBb are different, the resistance values of the magnetoresistive elements 2a and 2b are different. An output signal Vc of the bridge circuit illustrated in FIG. 6(*b*) is accordingly obtained. It becomes possible as a result to obtain a signal corresponding to the magnetic poles of the magnetic moving body 1 as the output signal Vo of the comparator 10, as illustrated in FIG. 6(*c*). In this case, the output signal Vc of the bridge circuit changes abruptly at the boundary between the N-poles and the S-poles of the magnetic moving body 1. As a result, the fluctuation in the fall position and the rise position of the output signal Vo of the comparator 10 is small, and the rotation of the magnetic moving body 1 can be detected with high precision.

In the present embodiment, a signal corresponding to the magnetic poles of the magnetic moving body 1 can thus be obtained as the output signal Vo of the comparator 10, and, accordingly, the revolutions or rotation angle of the magnetic moving body 1 can be detected with high precision by measuring the number of pulses of the output signal Vo.

In the present Embodiment 1, the region at which the output signal Vc of the bridge circuit and the threshold voltage Vref come close to each other is small, and false pulses derived from disturbance noise do not occur readily.

The direction in which the magnetoresistive elements 2a, 2b are disposed is the radial direction of the magnetic moving body 1, and the movement direction of the magnetic moving body is the circumferential direction. In consequence, the direction in which the magnetoresistive elements 2a, 2b are disposed is different from the movement direction of the magnetic moving body 1. Accordingly, high-precision detection is enabled thus with no dependence on the magnetic pole pitch of the magnetic moving body 1.

A detection method according to the present Embodiment 1 is suitable in particular for detecting a magnetic moving body having a small number of magnetic poles per rotation of a rotor and in which individual magnetic pole pitches are comparatively large, for instance in a magnetized rotor that is attached to a camshaft of an engine.

The magnetic detection device according to Embodiment 1 of the present invention is thus provided with: the magnetic moving body 1 in which N-poles and S-poles are disposed alternately on a circular outer periphery and which rotates with the rotating shaft 4 as an axis; the two magnetoresistive elements 2a, 2b disposed facing the outer periphery of the magnetic moving body 1 and which detect changes in the magnetic field of the magnetic moving body 1; the signal processing unit 11 that processes signals of the magnetoresistive elements 2a, 2b; and the magnet 3 that applies a bias magnetic field to the magnetoresistive elements 2a, 2b. The magnetization direction of the magnet 3 is parallel to the rotating shaft 4 of the magnetic moving body 1. The magnetoresistive elements 2a, 2b are disposed in a plane perpendicular the magnetization direction of the magnet 3. The magnetoresistive elements 2a, 2b are disposed side by side spaced apart from each other, and arranged in the radial direction of the magnetic moving body 1. In the present Embodiment 1, the magnetic detection device is configured in this way, hence the magnetoresistive elements 2a, 2b are disposed side by side in the radial direction of the magnetic moving body 1, not in the circumferential direction. Therefore, the magnetic detection device is not influenced by the magnetic pole pitch of the N-poles and S-poles of the magnetic moving body 1, and it becomes accordingly possible to detect the rotation of the magnetic moving body 1 with high precision, regardless of the magnetic pitch.

In the explanation above an example has been described in which the magnetoresistive elements 2a, 2b are disposed on the board 2 at positions shifted by distances La, Lb from the central axis C, in a direction towards the magnetic moving body 1. However, the embodiment is not limited thereto, and the magnetoresistive elements 2a, 2b may be disposed on the board 2 at positions shifted by distances La, Lb from the central axis C in a direction facing away from the magnetic moving body 1. In this case, however, the magnetoresistive element 2b is at a greater distance from the magnetic moving body 1 than the magnetoresistive element 2a, and hence the operation in the embodiment is reversed regarding this feature. Needless to say, the effect elicited is however identical to that of Embodiment 1.

Embodiment 2

Figure 7A:
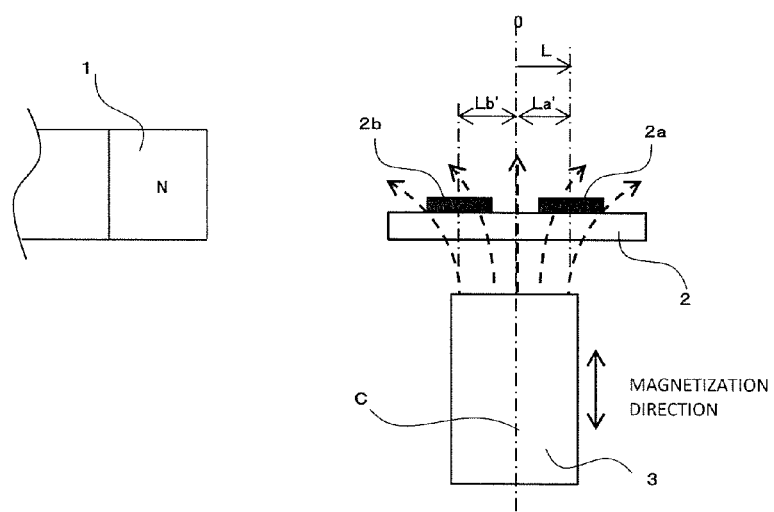
FIG. 7A is an enlarged side-view diagram of a detection unit in the magnetic detection device according to Embodiment 2 of the present invention.
Figure 7B:
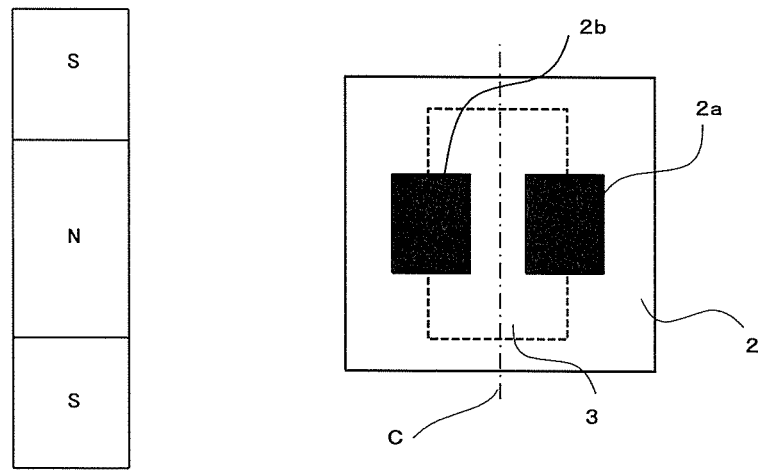
FIG. 7B is an enlarged top-view diagram of a detection unit in the magnetic detection device according to Embodiment 2 of the present invention.

FIG. 7A and FIG. 7B are enlarged-view diagrams of a detection unit of a magnetic detection device according to Embodiment 2 of the present invention. FIG. 7A illustrates a side-view diagram of a detection unit, and FIG. 7B illustrates a top-view diagram of a detection unit. The overall configuration of the magnetic detection device according to the present embodiment is identical to the configuration of Embodiment 1 illustrated in FIG. 1, and hence will not be explained herein.

In FIG. 7A, the magnet 3 is magnetized in a direction parallel to the rotating shaft 4, as denoted by the solid-line arrow, similarly to Embodiment 1. The board 2 is disposed in a plane substantially perpendicular to the magnetization direction of the magnet 3. The magnetoresistive elements 2a, 2b are disposed on both sides of the central axis C of the magnet 3 in the magnetization direction, across the central axis C. The magnetoresistive element 2b is disposed closer to the magnetic moving body 1 than the magnetoresistive element 2a. The magnetoresistive element 2a is disposed at a position shifted by a distance La' from the central axis C of the magnet 3, on the side opposite that of magnetic moving body 1. The magnetoresistive element 2b is disposed at a position shifted by a distance Lb' from the central axis C of the magnet 3, on the magnetic moving body 1 side. The distance La' is herein the distance between the center line of the magnetoresistive element 2a in the horizontal direction and the central axis C of the magnet 3, taking the horizontal direction as a direction perpendicular to the central axis C of the magnet 3. Similarly, the distance Lb' is the distance between the center line of the magnetoresistive element 2b in the horizontal direction and the central axis C of the magnet 3. In FIG. 7A, the distance La' and the distance Lb' are different from each other, and there holds the relationship Lb'>La'. However, the embodiment is not limited thereto, and there may hold Lb'<La'.

The dashed-line arrows in FIG. 7A denote the magnetic field generated by the magnet 3. A combined magnetic field of the magnetic field generated by the magnet 3 and the magnetic field generated by the magnetic moving body 1 is present around the magnetoresistive elements 2a, 2b. The magnetoresistive elements 2a, 2b detect only a magnetic field in a plane perpendicular to the rotating shaft 4, within the combined magnetic field. Herein the magnetic field Ba' is applied to the magnetoresistive element 2a and the magnetic field Bb' is applied to the magnetoresistive element 2b, as illustrated in FIG. 3.

Figure 8:
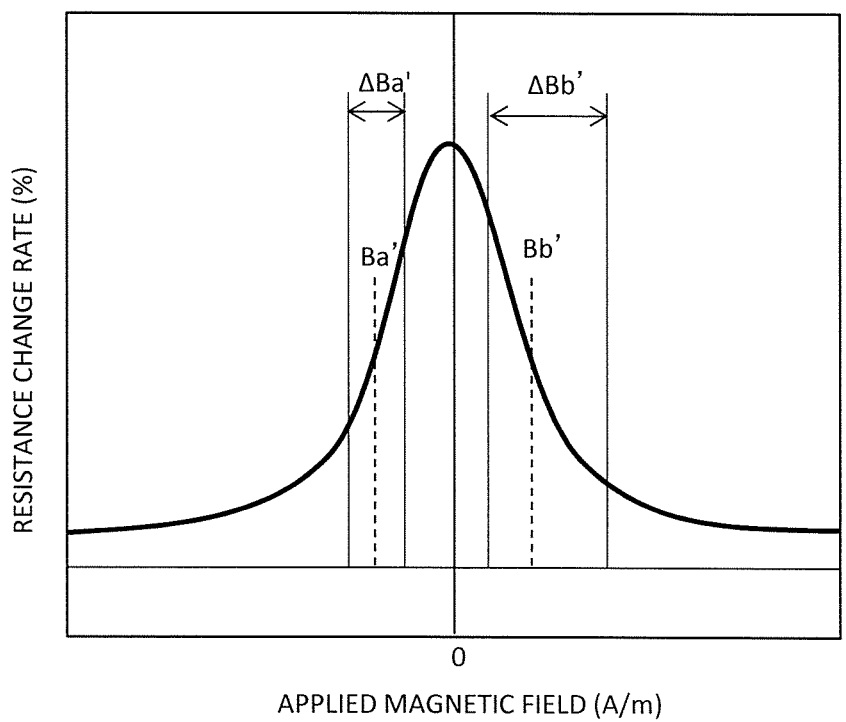
FIG. 8 is a diagram illustrating a MR loop characteristic of magnetoresistive elements in the magnetic detection device according to Embodiment 2 of the present invention.

FIG. 8 illustrates a diagram illustrating a characteristic, specifically an MR curve, of the magnetoresistive elements 2a, 2b. In FIG. 8, the horizontal axis is the magnetic field (A/m) applied to the magnetoresistive elements 2a, 2b. The vertical axis is a resistance change rate (%) of the magnetoresistive elements 2a, 2b. In FIG. 8, the magnetic field Ba' designates a component perpendicular to the magnetization direction of the magnet 3, within the bias magnetic field from the magnet 3 towards the magnetoresistive element 2a. Similarly, the magnetic field Bb' designates a component perpendicular to the magnetization direction of the magnet 3, within the bias magnetic field from the magnet 3 towards the magnetoresistive element 2b.

As described above, the magnetoresistive elements 2a, 2b in the present embodiment are disposed on both sides of the central axis C of the magnet 3 in the magnetization direction, across the central axis C. Accordingly, the bias magnetic fields Ba', Bb' having different orientations are respectively applied by the magnet 3 to the magnetoresistive elements 2a, 2b, as illustrated in FIG. 8.

As described above, the distances of the magnetoresistive elements 2a, 2b from the central axis C of the magnet 3 are different, and, accordingly, the magnitudes of the bias magnetic fields Ba', Bb' are different as well. The bias magnetic field Ba' is stronger than the bias magnetic field Bb', and there holds the relationship |Ba'|>|Bb'|. Accordingly, the resistance change is small even upon changes in the magnetic field that is applied to the magnetoresistive element 2a as the magnetic moving body 1 rotates. By contrast, the bias magnetic field Bb' that is weak is applied to the magnetoresistive element 2b, and hence the resistance change derived from changes in the magnetic field applied according to the rotation of the magnetic moving body 1 is large. As illustrated in FIG. 8, operating magnetic field ranges ΔBa', ΔBb', when the magnetic moving body 1 rotates with the rotating shaft 4 as an axis, obey a relationship ΔBa'<ΔBb'. Herein, ΔBa' is the operating magnetic field range of the magnetoresistive element 2a and ΔBb' is the operating magnetic field range of the magnetoresistive element 2b.

Changes in the resistance values in the magnetoresistive elements 2a, 2b undergo signal processing in the detection unit illustrated in FIG. 5 that has been explained for Embodiment 1.

Figure 9:
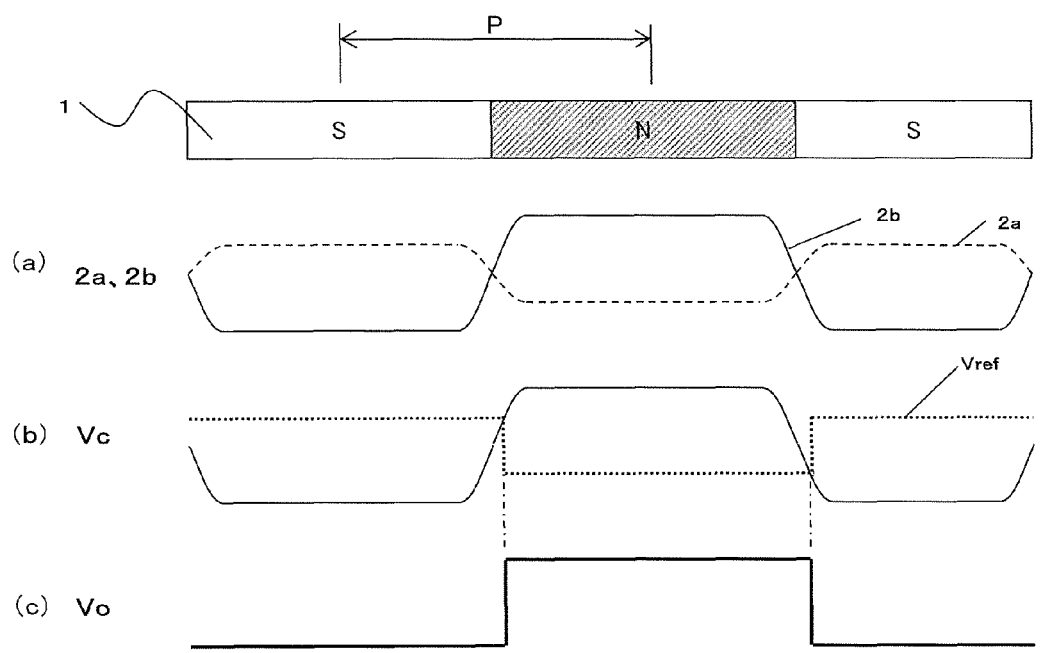
FIG. 9 is a timing chart illustrating the operation of the magnetic detection device according to Embodiment 2 of the present invention.
Figure 10:
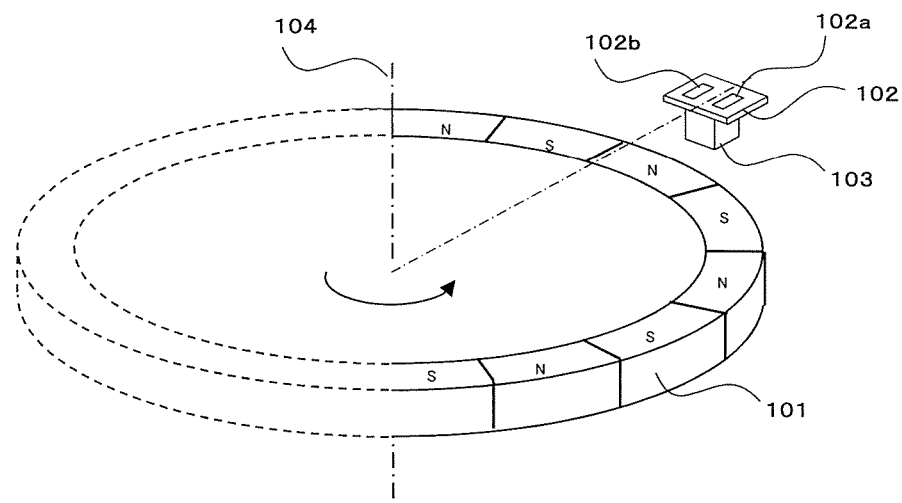
FIG. 10 is a perspective-view diagram illustrating the schematic configuration of a conventional magnetic detection device.
Figure 11A:
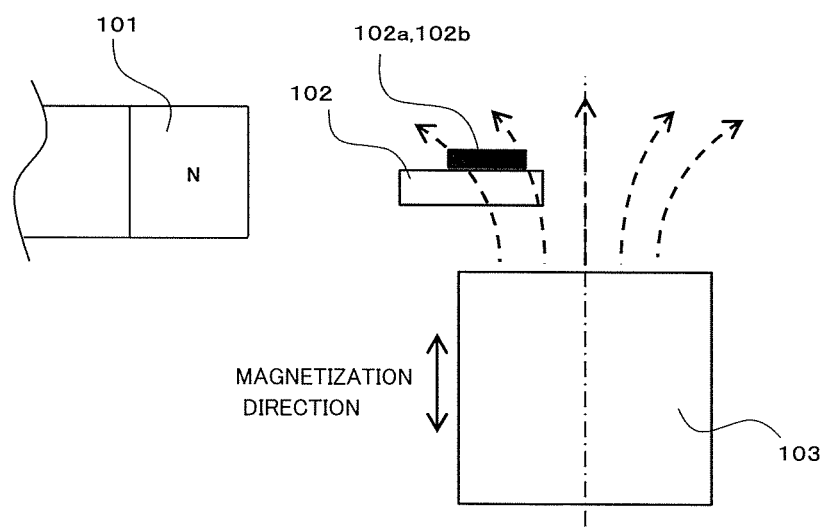
FIG. 11A is an enlarged side-view diagram of a detection unit in a conventional magnetic detection device.
Figure 11B:
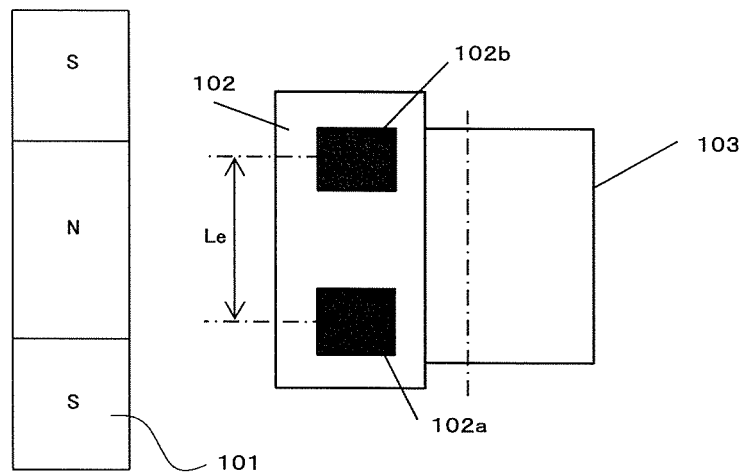
FIG. 11B is an enlarged top-view diagram of a detection unit in a conventional magnetic detection device.
Figure 12:
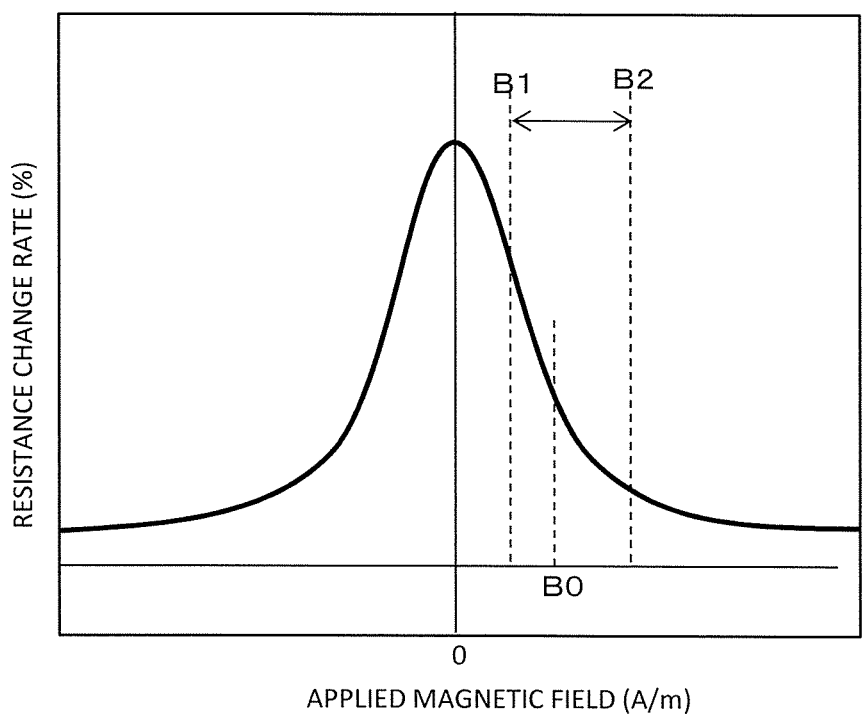
FIG. 12 is a diagram illustrating a MR loop characteristic of a magnetoresistive element of a conventional magnetic detection device.
Figure 13:
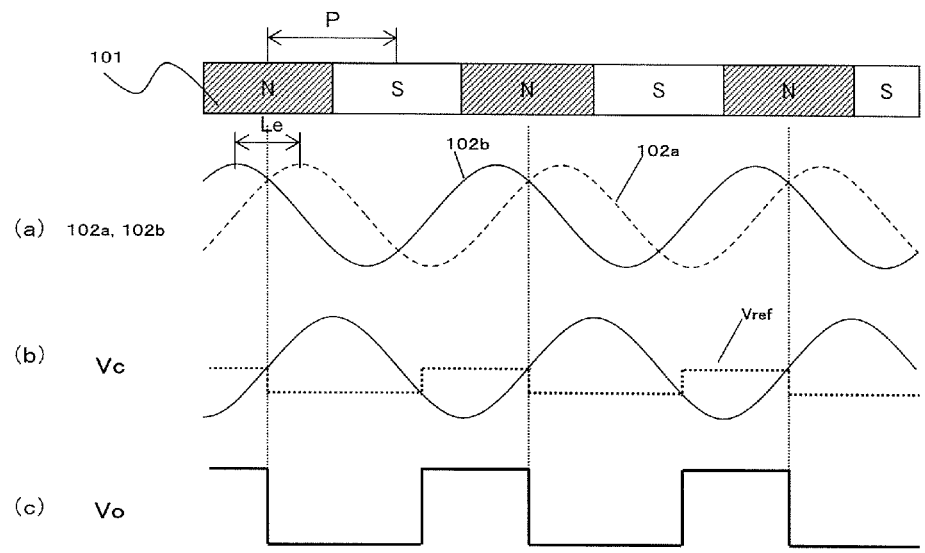
FIG. 13 is a timing chart for explaining the operation of a conventional magnetic detection device.
Figure 14:
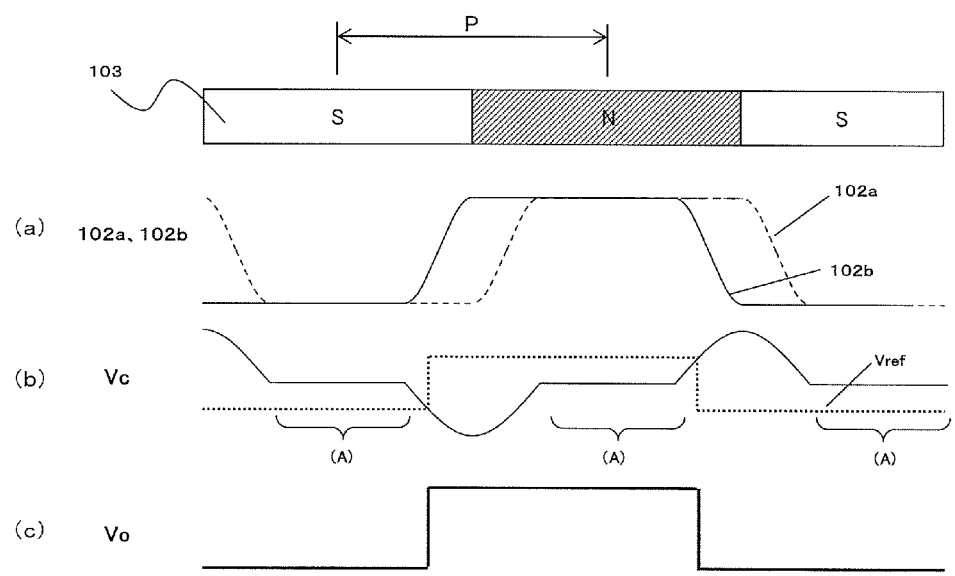
FIG. 14 is another timing chart for explaining the operation of a conventional magnetic detection device.

FIG. 9 is a timing chart illustrating the operation of the magnetic detection device according to the present Embodiment 2. In FIG. 9, (a) denotes the resistance change of the magnetoresistive elements 2a, 2b when the magnetic moving body 1 rotates about the rotating shaft 4, (b) denotes the output signal Vc of the bridge circuit, and (c) denotes the output signal Vo of the comparator 10. In FIG. 9(a), the dashed line denotes the resistance value of the magnetoresistive element 2a and the solid line denotes the resistance value of the magnetoresistive element 2b.

The magnetic field that is applied to the magnetoresistive elements 2a, 2b varies according to the rotation of the magnetic moving body 1 about the axis of the rotating shaft 4, and the resistance values of the magnetoresistive elements 2a, 2b vary as illustrated in FIG. 9(a). The orientation of the bias magnetic fields Ba', Bb' that are applied to the magnetoresistive elements 2a, 2b by the magnet 3 are different at this time, as illustrated in FIG. 8, and hence the resistance changes in the magnetoresistive elements 2a and 2b are different. In a case where, for instance, a S-pole of the magnetic moving body 1 is facing the detection unit, the orientation of the magnetic field from the magnet 3 that is applied to the magnetoresistive element 2a and the orientation of the magnetic field from the magnetic moving body 1 are reverse orientations. Accordingly, the magnetic field that is applied to the magnetoresistive element 2a is weak and the resistance value higher. On the other hand, as for the magnetoresistive element 2b, the orientation of the magnetic field from the magnet 3 and the orientation of the magnetic field from the magnetic moving body 1 are same and, accordingly, the applied magnetic field is stronger and the resistance value lower. An output signal Vc of a bridge circuit illustrated in FIG. 9(b) is obtained as a result. The output signal Vo of the comparator 10 is obtained, which is a signal corresponding to the magnetic poles of the magnetic moving body 1, as illustrated in FIG. 9(c).

As in Embodiment 1, in the present embodiment as well the output signal Vc of the bridge circuit varies abruptly at the boundaries between the N-poles and S-poles, and, accordingly, the fluctuation in the fall position and the rise position of the output signal Vo of the comparator 10 is small, and the rotation of the magnetic moving body 1 can be detected with high precision.

In the present embodiment, as described above, the magnetoresistive elements 2a, 2b are disposed side by side in the radial direction of the magnetic moving body 1, and hence are not influenced by the magnetic pole pitch of the magnetic moving body 1. Accordingly, the present embodiment enables high-precision detection with no dependence on the magnetic pole pitch of the magnetic moving body 1, similarly to Embodiment 1.

Embodiment 3

In Embodiment 3 of the present invention, the distances La' and Lb' at which the magnetoresistive elements 2a, 2b are disposed in Embodiment 2 as described above are set to obey a relationship La'=Lb'. In Embodiment 1, the magnetoresistive elements 2a, 2b are disposed on the same side with respect to the central axis C of the magnet 3, and hence the relationship La=Lb cannot apply herein. In the present embodiment, however, the magnetoresistive elements 2a, 2b are disposed on both sides of the central axis C of the magnet 3, across the central axis C, and it is possible to set La'=Lb'. Embodiment is identical to Embodiment 1 and Embodiment 2 as regards other features, and hence those features will not be explained herein.

In the present embodiment, the distances La' and Lb' at which the magnetoresistive elements 2a, 2b are disposed are set to be equal, i.e. to obey La'=Lb'. Accordingly, the magnetic fields Ba', Bb' that are applied to the magnetoresistive elements 2a, 2b satisfy Ba'=−Bb'. As a result, the magnetic fields Ba', Bb' that are applied to the magnetoresistive elements 2a, 2b are magnetic fields of identical strength but different orientation. As illustrated in FIG. 8, the change in resistance of the magnetoresistive elements 2a, 2b depends not on the orientation but on the strength of the magnetic field. The resistance values of the magnetoresistive elements 2a, 2b, having magnetic fields of identical strength but dissimilar orientation applied thereto, are accordingly identical. In consequence, the resistance values of the magnetoresistive elements 2a, 2b change equally even in a case where the resistance values of the magnetoresistive elements 2a, 2b vary depending on external factors such as temperature. The threshold voltage Vref of the comparator 10 illustrated in FIG. 5 can be therefore set as follows.

$$Vref=Vcc/2$$

As a result, the rotation of the magnetic moving body can be detected with high precision even when there is a disturbance factor such as temperature or the like.

As has been described, similarly to Embodiments 1 and 2, the present embodiment enables high-precision detection with no dependence on the magnetic pole pitch of the magnetic moving body 1. In the present embodiment, the magnetoresistive elements 2a, 2b are disposed across the central axis C of the magnet 3 in the magnetization direction, at identical distances from the central axis C of the magnet 3 in the magnetization direction. Therefore, the rotation of the magnetic moving body can be detected with high precision even when there is a disturbance factor such as temperature or the like.

Embodiment 4

In Embodiment 4 of the present invention, the magnetic field (hereafter referred to as magnetic field Bmag) from the magnet 3 that applies the bias magnetic field to the magnetoresistive elements 2a, 2b is set in such a manner that in the configurations of Embodiments 1 to 3 a combined magnetic field strength of the magnetic field (hereafter referred to as magnetic field Btarget) from the magnetic moving body 1 as detected by the magnetoresistive elements 2a, 2b and the magnetic field Bmag from the magnet 3 are $$Btarget+Bmag>0$$

at all times.

As a result, the change in magnetic field that is applied to the magnetoresistive elements 2a, 2b never occurs over a zero magnetic field, and thus good signals can be obtained.

As has been described, similarly to Embodiments 1-3, the present embodiment enables high-precision detection with no dependence on the magnetic pole pitch of the magnetic moving body 1. In the present embodiment, the magnitude of the magnetic field from the magnet 3 is set in such a manner that the strength of the combined magnetic field Btarget+Bmag of the magnetic field from the magnetic moving body 1 as detected by the magnetoresistive elements 2a, 2b and the magnetic field from the magnet 3 is not zero at any time. Therefore, the change in magnetic field that is applied to the magnetoresistive elements 2a, 2b never occurs over a zero magnetic field, and thus good signals can be obtained.

Embodiment 5

In Embodiment 5 of the present invention, giant magnetoresistive elements (hereafter referred to as GMR elements) of strength detection type are used as the magnetoresistive elements 2a, 2b in Embodiments 1-3.

The GMR elements are each constructed of a so-called artificial lattice film i.e. a stack in which magnetic layers and non-magnetic layers having a thickness in the range from several angstrom to several tens of angstroms are alternately stacked. Compared with magnetoresistive elements (MR elements), GMR elements have a remarkably pronounced MR effect (MR rate of change) and exhibit characteristically changes in resistance depending on the strength of an magnetic field within the plane of stacking. By using GMR elements in the magnetoresistive elements 2a, 2b, SN ratio and noise resistance can be thus increased.

As has been described, similarly to Embodiments 1-3, the present embodiment enables high-precision detection with no dependence on the magnetic pole pitch of the magnetic moving body 1. In the present embodiment, the magnetoresistive elements 2a, 2b are made up of giant magnetoresistive elements that use an artificial lattice film, and hence it becomes possible to increase SN ratio and noise resistance.

Embodiment 6

In Embodiment 6 of the present invention, a ferrite is used as the magnetic material of the magnetic moving body 1 in Embodiments 1-3. Specifically, the outer periphery of the magnetic moving body 1 is magnetized, using a ferrite, in such a manner that N-poles and S-poles are disposed alternately.

Ferrite is inexpensive, but the magnetic force thereof is weak, and accordingly, changes in magnetic field upon rotation of the magnetic moving body 1 are small. However, by using the magnetoresistive elements 2a, 2b as detection elements, a sufficient resistance change can be detected, and a high-precision magnetic detection device can be obtained economically even if magnetic field changes are small.

As has been described, similarly to Embodiments 1-3, the present embodiment enables high-precision detection with no dependence on the magnetic pole pitch of the magnetic moving body 1. In the present embodiment, costs can be reduced, while preserving high-precision magnetic detection, since a ferrite is used as the magnetic material of the magnetoresistive elements 2a, 2b.

Embodiment 7

In Embodiment 7 of the present invention, a magnet is used as the magnetic material of the magnetic moving body 1 in Embodiments 1-3. Specifically, the outer periphery of the magnetic moving body 1 is magnetized, using a magnet, in such a manner that N-poles and S-poles are disposed alternately. In the present embodiment, a material substantially identical to that of the magnet 3 that applies a bias magnetic field to the magnetoresistive elements 2a, 2b is used as the magnet that is used as a magnetic material of the magnetic moving body 1.

The temperature characteristic of the magnetic forces of the magnet varies depending on the magnetic material that is used. For instance, a temperature coefficient of residual magnetic flux density exhibits a five times or greater difference between a SmCo-based magnet and a ferrite-based magnet. By setting the magnetic material of the magnetic moving body 1 and the magnetic material of the magnet 3 to be substantially identical with each other, it becomes possible to obtain good signals, without the magnetic field that is applied to the magnetoresistive elements 2a, 2b ever straddling a zero magnetic field, even upon changes in temperature.

As has been described, similarly to Embodiments 1-3, the present embodiment enables high-precision detection with no dependence on the magnetic pole pitch of the magnetic moving body 1. In the present embodiment, moreover, the magnetic material of the magnetic moving body 1 and the magnet 3 are configured of the same material. Therefore, favorable signals can be obtained, with the magnetic field that is applied to the magnetoresistive elements 2a, 2b never straddling a zero magnetic field, even upon changes in temperature.

What is claimed is:

1. A magnetic detection device, comprising:
    a magnetic moving body in which N-poles and S-poles are disposed alternately on a circular outer periphery thereof and which rotates with a rotating shaft as an axis;
    two magnetoresistive elements that are disposed adjacent the outer periphery of the magnetic moving body and that detect changes in a magnetic field of the magnetic moving body;
    a signal processing unit that processes signals of the magnetoresistive elements; and
    a magnet that applies a bias magnetic field to the magnetoresistive elements,
    wherein a magnetization direction of the magnet is parallel to the rotating shaft of the magnetic moving body; and
    the magnetoresistive elements are disposed in a plane perpendicular to the magnetization direction of the magnet, and
    the magnetoresistive elements are disposed side by side spaced apart from each other in a radial direction of the magnetic moving body.

2. The magnetic detection device according to claim 1, wherein the two magnetoresistive elements are disposed closer to the magnetic moving body than a central axis of the magnet in the magnetization direction.

3. The magnetic detection device according to claim 1, wherein the two magnetoresistive elements are disposed across a central axis of the magnet in the magnetization direction.

4. The magnetic detection device according to claim 3, wherein the two magnetoresistive elements are disposed at a same distance from the central axis of the magnet in the magnetization direction.

5. The magnetic detection device according to claim 1, wherein the magnitude of the magnetic field from the magnet is set such that a strength of a combined magnetic field of the magnetic field from the magnetic moving body, as detected by the magnetoresistive elements, and the magnetic field from the magnet is not zero.

6. The magnetic detection device according to claim 1, wherein the magnetoresistive elements detect a magnetic field strength in a plane perpendicular to the rotating shaft of the magnetic moving body.

7. The magnetic detection device according to claim 1, wherein the magnetoresistive elements are giant magnetoresistive elements that use an artificial lattice film.

8. The magnetic detection device according to claim 1, wherein a magnetic material of the magnetic moving body is a ferrite.

9. The magnetic detection device according to claim 1, wherein a magnetic material of the magnetic moving body and a magnetic material of the magnet are identical with each other.

* * * * *